(12) United States Patent
Yang et al.

(10) Patent No.: US 9,723,313 B2
(45) Date of Patent: Aug. 1, 2017

(54) METHOD AND DEVICE FOR ENCODING AND DECODING VIDEOS USING A BEST TRANSFORMATION MATRIX AMONG MULTIPLE TRANSFORMATION MATRICES

(75) Inventors: Mingyuan Yang, Beijing (CN); Dong Wang, Beijing (CN); Lianhuan Xiong, Shenzhen (CN); Xin Zhao, Beijing (CN); Li Zhang, Beijing (CN); Siwei Ma, Beijing (CN); Wen Gao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1227 days.

(21) Appl. No.: 13/452,198

(22) Filed: Apr. 20, 2012

(65) Prior Publication Data

US 2012/0201303 A1    Aug. 9, 2012

Related U.S. Application Data

(63) Continuation of application No. PCT/CN2010/076464, filed on Aug. 30, 2010.

(30) Foreign Application Priority Data

Oct. 23, 2009  (CN) .......................... 2009 1 0209013
Apr. 9, 2010   (CN) .......................... 2010 1 0147581
Jun. 17, 2010  (CN) .......................... 2010 1 0213791

(51) Int. Cl.
 H04N 19/136    (2014.01)
 H04N 19/159    (2014.01)
 (Continued)

(52) U.S. Cl.
 CPC ......... *H04N 19/136* (2014.11); *H04N 19/122* (2014.11); *H04N 19/147* (2014.11);
 (Continued)

(58) Field of Classification Search
 CPC .................................................. H04N 19/136
 See application file for complete search history.

(56) References Cited

U.S. PATENT DOCUMENTS

| 2003/0103679 A1 | 6/2003 | Etoh et al. |
| 2006/0133509 A1 | 6/2006 | Schwartz |

(Continued)

FOREIGN PATENT DOCUMENTS

| CN | 1496653 A | 5/2004 |
| CN | 1564602   | 1/2005 |

(Continued)

OTHER PUBLICATIONS

Written Opinion of the International Searching Authority mailed Dec. 2, 2010 issued in corresponding International Patent Application No. PCT/CN2010/076464.

(Continued)

*Primary Examiner* — James Pontius
(74) *Attorney, Agent, or Firm* — Staas & Halsey LLP

(57) ABSTRACT

The embodiments of the present invention provide a method and a device for encoding and decoding videos, and relate to the communication field, and an efficient transformation matrix corresponding to features of each residual block is selected for transformation, which therefore improves encoding efficiency. The solution provided in an embodiment of the present invention is: generating a prediction residual according to input video data; selecting a set of best transformation matrixes among multiple candidate transformation matrixes according to an intra-frame prediction mode and rate-distortion criteria to perform transform-coding on the prediction residual and obtain a transformation result; and generating an encoded stream according to the transformation result and selected transformation matrix index information.

21 Claims, 8 Drawing Sheets

(51) Int. Cl.
H04N 19/176 (2014.01)
H04N 19/147 (2014.01)
H04N 19/46 (2014.01)
H04N 19/122 (2014.01)
H04N 19/61 (2014.01)

(52) U.S. Cl.
CPC ......... H04N 19/159 (2014.11); H04N 19/176 (2014.11); H04N 19/46 (2014.11); H04N 19/61 (2014.11)

(56) References Cited

U.S. PATENT DOCUMENTS

| | | |
|---|---|---|
| 2007/0206679 A1 | 9/2007 | Lim et al. |
| 2008/0260030 A1 | 10/2008 | Karczewicz |
| 2008/0310512 A1* | 12/2008 | Ye ................... H04N 19/00812 375/240.16 |
| 2009/0097571 A1 | 4/2009 | Yamada et al. |
| 2012/0201303 A1* | 8/2012 | Yang ................... H04N 19/159 375/240.14 |

FOREIGN PATENT DOCUMENTS

| | | |
|---|---|---|
| CN | 101019435 A | 8/2007 |
| CN | 101489134 | 7/2009 |
| CN | 102045560 B | 8/2013 |
| KR | 10-2003-0014695 | 2/2003 |
| WO | 2008/132890 A1 | 11/2008 |
| WO | 2008/157360 | 12/2008 |

OTHER PUBLICATIONS

First Chinese Office Action mailed Apr. 28, 2012 issued in corresponding Chinese Patent Application No. 201010213791.8.
Korean Office Action dated Jun. 16, 2014 in corresponding Korean Patent Application No. 10-2012-7011936.
Extended European Search Report dated Jun. 17, 2014 in corresponding European Patent Application No. 10824420.3.
"Directional Discrete Cosine Transforms for Image Coding", Zeng et al., ICME 2006, pp. 721-724.
International Search Report for PCT/CN2010/076464 mailed Dec. 2, 2010.
Second Office Action, dated Nov. 15, 2012, in corresponding Chinese Application No. 201010213791.8 (11 pp.).
International Search Report mailed Dec. 2, 2010 issued in corresponding International Patent Application No. PCT/CN2010/076464.
Yan Ye et al., "Improved intra Coding", ITU—Telecommunications Standardization Sector, Video Coding Experts Group (VCEG), Meeting #33, Oct. 2007, pp. 1-6.
Yan Ye et al., "Improved H.264 Intra Coding Based on Bi-Directional Intra Prediction, Directional Transform, and Adaptive Coefficient Scanning", ICIP 2008, pp. 2116- 2119.
ITU-T, H.264, Mar. 2005, pp. i-xiv, 1-324.

* cited by examiner

METHOD AND DEVICE FOR ENCODING AND DECODING VIDEOS USING A BEST TRANSFORMATION MATRIX AMONG MULTIPLE TRANSFORMATION MATRICES

CROSS-REFERENCE TO RELATED APPLICATIONS

This application is a continuation of International Application No. PCT/CN2010/076464, filed on Aug. 30, 2010, which claims priority to Chinese Patent Application No. 200910209013.9, filed on Oct. 23, 2009, Chinese Patent Application No. 201010147581.3, filed on Apr. 9, 2010, and Chinese Patent Application No. 201010213791.8, filed on Jun. 17, 2010, which are hereby incorporated by reference in their entireties.

FIELD OF THE INVENTION

The present invention relates to the communications field, and in particular, to a method and a device for encoding and decoding videos.

BACKGROUND OF THE INVENTION

A complete system for encoding and decoding videos include an encoder part and a decoder part. Generally, on an encoder side under a hybrid encoding framework, video signals pass through a predicting module first. The encoder selects the best mode in several prediction modes according to certain optimization criteria, and then generates residual signals. The residual signals are transformed and quantized, and then sent to an entropy encoding module, and finally form output streams. On the decoder side, the output streams are resolved to obtain prediction mode information, and a predicted signal that is completely the same as the signal on the encoder is generated. Afterward, a quantized transformation coefficient value is obtained from the resolved streams, and inverse quantization and inverse transformation are performed to generate a reconstructed residual signal. Finally, the predicted signal and the reconstructed residual signal are combined to form a reconstructed video signal.

Under a hybrid encoding framework, a key technology in the encoding process is transformation. The function of transformation is: transforming a residual into another expression through linear operation on a residual block, and under such an expression, energy of data is centralized on a few transformation coefficients, and the energy of most other coefficients is very low or even zero. Through such transformation, the subsequent entropy encoding can be performed efficiently. In video encoding, for a residual block X, if X is regarded as a matrix, the transformation is actually to multiply matrixes. A form of the multiplication is $F=C \cdot X \cdot R$, in which C and R are transformation matrixes whose dimensions are the same as the dimensions of X, and F is a transformation coefficient matrix as a result of the transformation. Compared with other types of transformation in the prior art, discrete cosine transform (Discrete Cosine Transform, DCT) is a better tradeoff between complexity and performance, and therefore is widely applied.

In the video encoding technology, a mode dependent directional transform (Mode dependent Directional Transform, MDDT) technology is adopted. The essence of the MDDT is: (1) The residuals obtained through different intra-frame prediction modes reflect different statistic features, and therefore, different transformation matrixes should be used, according to different prediction directions, to improve compression encoding efficiency; and (2) to reduce complexity of transformation, the MDDT separates rows from columns, and generates a pair of transformation matrixes, namely, a column transformation matrix Ci and a row transformation matrix Ri, and therefore, the transformation process is $Fi=Ci \cdot X \cdot Ri$, in which i is a corresponding intra-frame prediction mode, X is a prediction residual, and Fi is a transformed prediction residual; Ci and Ri show that horizontal transformation is separated from vertical transformation by a Ci matrix and an Ri matrix, which is known as transformation with columns separated from rows.

In the process of implementing the foregoing transformation, the inventor finds at least the following problems in the prior art:

Although the MDDT technology can apply a different set of transformation matrixes to different prediction directions for intra-frame encoding, in a practical encoding process the statistic features of residual data still differ obviously even if the intra-frame prediction mode is the same. Therefore, the foregoing method, in which one intra-frame prediction mode corresponds to a set of transformation matrixes, is still not accurate enough, and leads to low efficiency of subsequent encoding.

SUMMARY OF THE INVENTION

An embodiment of the present invention provides a method and a device for encoding and decoding videos, where an efficient transformation matrix corresponding to features of each residual block is selected for transformation, which therefore improves encoding efficiency.

To fulfill the above objectives, the embodiments of the present invention provide the following technical solutions:

A method for encoding video data, including:

generating a prediction residual according to input video data;

selecting a set of best transformation matrixes among multiple candidate transformation matrixes according to an intra-frame prediction mode and rate-distortion criteria to perform transform-coding on the prediction residual and obtain a transformation result; and generating an encoded stream according to the transformation result and selected transformation matrix index information.

A video data encoder, including:

a residual generating unit, configured to generate a prediction residual according to input video data;

a transforming unit, configured to select a set of best transformation matrixes among multiple candidate transformation matrixes according to an intra-frame prediction mode and rate-distortion criteria to perform transform-coding on the prediction residual and obtain a transformation result; and a stream generating unit, configured to generate an encoded stream according to the transformation result and selected transformation matrix index information.

A method for decoding video data, including:

resolving an encoded video stream to obtain a calculation result and encoding transformation coefficient matrix index information.

determining the transformation coefficient matrix among multiple candidate transformation matrixes according to the index information and an intra-frame prediction mode, using the transformation coefficient matrix to perform inverse transformation on the calculation result to obtain residual data, and reconstructing video data according to the residual data.

A video decoder, including:
a resolving unit, configured to resolve a video stream to obtain a calculation result and encoding transformation coefficient matrix index information;
a determining unit, configured to determine a transformation coefficient matrix among multiple candidate transformation matrixes according to the index information and an intra-frame prediction mode; and
a reconstructing unit, configured to use the transformation coefficient matrix to perform inverse transformation on the calculation result to obtain residual data, and reconstruct video data according to the residual data.

A method for encoding video data, including:
generating a prediction residual according to input video data;
selecting a set of best transformation matrixes among multiple candidate transformation matrixes according to an intra-frame prediction mode and optimization criteria to perform transform-coding on the prediction residual and obtain a transformation result; and
generating an encoded stream according to the transformation result and selected transformation matrix index information.

A video decoding method, including:
resolving an encoded video stream to obtain a transformation result and transformation matrix index information; and
determining a set of transformation matrixes among multiple candidate transformation matrixes according to the transformation matrix index information and an intra-frame prediction mode, using the set of transformation matrixes to perform inverse transformation on the transformation result to obtain residual data, and reconstructing video data according to the residual data.

A method for encoding video data, including:
generating a prediction residual according to input video data;
selecting a set of best transformation matrixes among multiple candidate transformation matrixes according to optimization criteria to perform transform-coding on the prediction residual and obtain a transformation result; and
encoding selected transformation matrix index information according to the transformation result and an intra-frame prediction mode to generate an encoded stream.

A video decoding method, including:
resolving an encoded video stream to obtain a transformation result, and obtaining transformation matrix index information according to an intra-frame prediction mode; and
determining a transformation matrix among multiple candidate transformation matrixes according to the transformation matrix index information, using the determined transformation matrix to perform inverse transformation on the transformation result to obtain residual data, and reconstructing video data according to the residual data.

A video data encoder, including:
a residual generating unit, configured to generate a prediction residual according to input video data;
a transforming unit, configured to select a set of best transformation matrixes among multiple candidate transformation matrixes according to optimization criteria to perform transform-coding on the prediction residual and obtain a transformation result; and
a stream generating unit, configured to encode selected transformation matrix index information according to the transformation result and an intra-frame prediction mode to generate an encoded stream.

A video decoder, including:
a resolving unit, configured to resolve a video stream to obtain a transformation result, and obtain transformation matrix index information according to an intra-frame prediction mode;
a determining unit, configured to determine a transformation matrix among multiple candidate transformation matrixes according to the transformation matrix index information; and
a reconstructing unit, configured to use the determined transformation matrix to perform inverse transformation on the transformation result to obtain residual data, and reconstruct video data according to the residual data.

The method and the device for encoding and decoding videos in the embodiments of the present invention select a set of best transformation matrixes among multiple candidate transformation matrixes according to an intra-frame prediction mode and rate-distortion criteria to perform transform-coding on the prediction residual and obtain a transformation result. Through such a mode for encoding, the most efficient transformation matrix corresponding to features of each residual block is selected for transformation, which improves encoding efficiency. Also, the transformation coefficient matrixes are selected among multiple candidate transformation matrixes according to the transformation coefficient matrix index information and the intra-frame prediction mode, inverse transformation is performed by using the transformation coefficient matrixes to obtain residual data, and video data is reconstructed according to the residual data.

BRIEF DESCRIPTION OF THE DRAWINGS

To describe the technical solution of the present invention more clearly, the following briefly introduces the accompanying drawings involved in the description of the embodiments of the present invention or the prior art. Apparently, the accompanying drawings are illustrative, and persons skilled in the art may derive other drawings from these drawings without creative efforts.

DETAILED DESCRIPTION OF THE EMBODIMENTS

The following detailed description is given in conjunction with the accompanying drawings in order to provide a clear and thorough understanding of the present invention. Evidently, the drawings and the detailed description are merely representative of particular embodiments of the present invention rather than all embodiments. All other embodiments, which can be derived by those skilled in the art from the embodiments given here without creative efforts, shall fall within the protection scope of the present invention.

Figure 1:
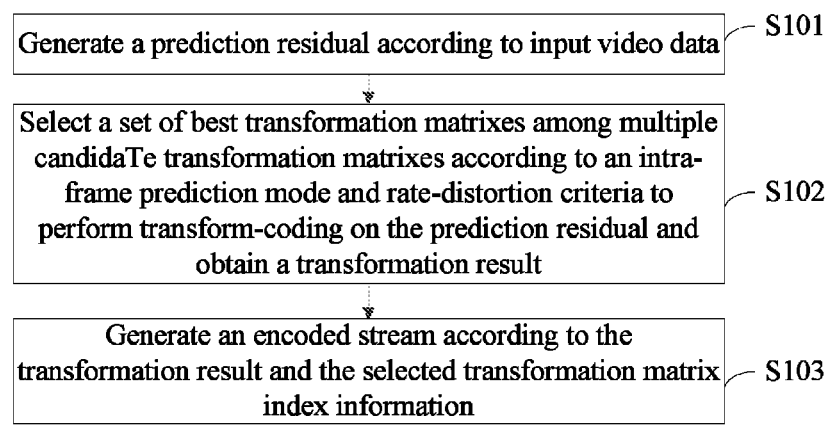
FIG. 1 is a block flowchart of a video encoding method according to an embodiment of the present invention.

As shown in FIG. 1, a method for encoding video data in an embodiment of the present invention includes the following steps:

S101: Generate a prediction residual according to input video data.

S102: Select a set of best transformation matrixes among multiple candidate transformation matrixes according to an intra-frame prediction mode and rate-distortion criteria to perform transform-coding on the prediction residual and obtain a transformation result.

In the process of transformation, the mode of separating a column from a row may be applied. That is, according to the intra-frame prediction mode, traversing all possible combinations of a column transformation matrix and a row transformation matrix in multiple candidate transformation matrixes, selecting a transformation combination with a minimum rate-distortion cost after multiplication of the matrixes as a transformation coefficient matrix, and obtaining a transformation result.

S103: Generate an encoded stream according to the transformation result and selected transformation matrix index information.

Further, the method may include a coefficient scanning process: selecting a scan order of a set of coefficients according to the intra-frame prediction mode and the transformation matrix index information to scan a transformed coefficient.

Then, the one with the minimum rate-distortion cost after the transformation is selected as the best intra-frame prediction mode, and its result is quantized and then undergoes entropy encoding.

Besides, the transformation coefficient matrix index information may be written into the encoded data.

According to the video encoding method provided in this embodiment, a set of best transformation matrixes among multiple candidate transformation matrixes may be selected according to an intra-frame prediction mode and rate-distortion criteria to perform transform-coding on the prediction residual and a transformation result is obtained. Through such a mode for encoding, the most efficient transformation matrix corresponding to features of each residual block is selected for transformation, which therefore improves encoding efficiency.

The following gives more details about the video data encoding method provided in an embodiment of the present invention with reference to FIG. 1:

S101: Generate a prediction residual according to input video data.

S102: Select a set of best transformation matrixes among multiple candidate transformation matrixes according to an intra-frame prediction mode and rate-distortion criteria to perform transform-coding on the prediction residual and obtain a transformation result.

In this embodiment, the selected set of best transformation matrixes may be a non-separate transformation matrix or may be a pair of transformation matrixes that include a column transformation matrix and a row transformation matrix.

In this embodiment, a set of best transformation matrixes are selected among multiple candidate transformation matrixes according to the intra-frame prediction mode and the rate-distortion criteria to perform transform-coding on the prediction residual and obtain a transformation result. In other words, according to the intra-frame prediction mode, transform-coding is performed on the prediction residual by using multiple candidate transformation matrixes, a set of best transformation matrixes are selected according to the rate-distortion criteria, and the transformation result corresponding to the set of best transformation matrixes is used together with the selected transformation matrix index information subsequently to generate an encoded stream.

In the process of transformation, the mode of separating the column from the row may be applied. That is: according to the intra-frame prediction mode, traversing all possible combinations of the column transformation matrix and the row transformation matrix in multiple candidate transformation matrixes, selecting the transformation combination with the minimum rate-distortion cost after multiplication of the matrixes as a transformation matrix, and obtaining a transformation result. In other words, the details of this mode are: according to the intra-frame prediction mode, traversing all combinations of the column transformation matrix and the row transformation matrix in multiple candidate transformation matrixes, selecting the transformation combination with the minimum rate-distortion cost after residual transform-coding as a best transformation matrix, and using the transformation result corresponding to the set of best transformation matrixes together with the selected transformation matrix index information subsequently to generate an encoded stream.

S103: Generate an encoded stream according to the transformation result and selected transformation matrix index information.

Further, this embodiment may also include a coefficient scanning process: selecting a scan order of a set of coefficients according to the intra-frame prediction mode and the transformation matrix index information to scan the transformed coefficient.

Then, the one with the minimum rate-distortion cost after the transformation is selected as the best intra-frame prediction mode, and its result is quantized and then undergoes entropy encoding. That is, the prediction residual is encoded in various encoding modes, where the mode with the minimum rate-distortion cost is selected as the intra-frame prediction mode, and an encoding result is obtained.

In this embodiment, the generating of the encoded stream according to the transformation result and the selected transformation matrix index information includes: writing the transformation matrix index information into the encoded data.

If the set of best transformation matrixes are a pair of transformation matrixes, the writing of the transformation matrix index information into the encoded data includes: encoding the index information of a pair of transformation matrixes jointly, or encoding the index information of a pair of transformation matrixes separately, and writing the encoding result of the index information into the encoded data.

Joint encoding indicates that the column transformation matrix and the row transformation matrix appear in pairs, and each row transformation matrix corresponds to a column transformation matrix; separate encoding indicates that a column transformation matrix does not necessarily correspond to a row transformation matrix. For example, a row transformation matrix may correspond to a random column transformation matrix, which may save storage space of the transformation matrixes.

The video encoding method in this embodiment may select a set of best transformation matrixes among multiple candidate transformation matrixes according to an intra-frame prediction mode and rate-distortion criteria to perform transform-coding on the prediction residual and obtain a transformation result. Through such a mode for encoding, the most efficient transformation matrix corresponding to features of each residual block is selected for transformation, which therefore improves encoding efficiency.

Figure 2:
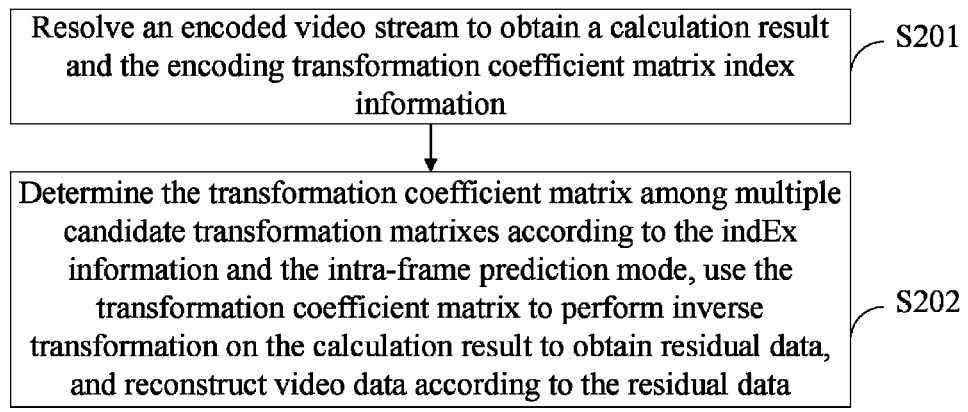
FIG. 2 is a block flowchart of a video decoding method according to an embodiment of the present invention.

As shown in FIG. 2, a video decoding method provided in an embodiment of the present invention includes the following steps:

S201: Resolve an encoded video stream to obtain a calculation result and encoding transformation coefficient matrix index information.

Further, the method may also include an inverse coefficient scanning process: selecting a scan order of a set of coefficients according to the intra-frame prediction mode and the transformation coefficient matrix index information to perform inverse coefficient scanning on the transformed coefficient.

S202: Determine the transformation coefficient matrix among multiple candidate transformation matrixes according to the index information and the intra-frame prediction mode, use the transformation coefficient matrix to perform inverse transformation on the calculation result to obtain residual data, and reconstruct video data according to the residual data.

Specifically, if separate transformation is applied in the encoding transformation process, the transformation coefficient matrix in step S202 may be determined among a set of candidate row transformation matrixes and column transformation matrixes according to the row transformation coefficient matrix index information and the column transformation coefficient matrix index information in the index information, and the intra-frame prediction mode.

According to the video decoding method provided in this embodiment, the encoded video stream can be resolved to obtain a calculation result and encoding transformation coefficient matrix index information, the transformation coefficient matrix is determined among multiple candidate transformation matrixes according to the index information and the intra-frame prediction mode, the transformation coefficient matrix is used to perform inverse transformation on the calculation result to obtain residual data, and video data is reconstructed according to the residual data. In this way, decoding is performed without increasing complexity. Because the encoding is based on the method provided in the preceding embodiment, the best transformation matrix can be selected with respect to the residual features, and the entropy encoding efficiency is improved. Further, through the decoding method provided in this embodiment, the efficiency of encoding and decoding videos can be improved on the whole.

The following gives more details about the video decoding method provided in an embodiment of the present invention with reference to FIG. 2:

S201: Resolve an encoded video stream to obtain a calculation result and transformation matrix index information.

In this embodiment, the result obtained after resolution includes the transformation result. That is, the calculation result used in this embodiment is the transformation result. The transformation result may include the transformation coefficient matrix obtained after transformation.

Further, this embodiment also includes an inverse coefficient scanning process: selecting a scan order of a set of coefficients according to the intra-frame prediction mode and the transformation matrix index information to perform inverse coefficient scanning on the transformed coefficient.

S202: Determine a transformation matrix among multiple candidate transformation matrixes according to the transformation matrix index information and an intra-frame prediction mode, use the determined transformation matrix to perform inverse transformation on the calculation result to obtain residual data, and reconstruct video data according to the residual data.

In this embodiment, the determined transformation matrix is a set of transformation matrixes, and the set of transformation matrixes may be a non-separate transformation matrix or may be a pair of transformation matrixes that include a column transformation matrix and a row transformation matrix.

Specifically, if separate transformation is applied in the encoding transformation process, the transformation matrix in step S202 may be determined among a set of candidate row transformation matrixes and column transformation matrixes according to the row transformation matrix index information and the column transformation matrix index information in the index information, and the intra-frame prediction mode. The set of candidate row transformation matrixes and column transformation matrixes here include multiple row transformation matrixes and column transformation matrixes.

According to the video decoding method provided in this embodiment, the encoded video stream can be resolved to obtain a calculation result and transformation matrix index information, the transformation matrix is determined among multiple candidate transformation matrixes according to the transformation matrix index information and the intra-frame prediction mode, the transformation matrix is used to perform inverse transformation for the calculation result to obtain residual data, and video data is reconstructed according to the residual data. In this way, the decoding is performed without increasing complexity. Because the encoding is based on the method provided in the preceding embodiment, the best transformation matrix can be selected with respect to the residual features, and therefore the entropy encoding efficiency is improved. Further, through the decoding method provided in this embodiment, the efficiency of encoding and decoding videos can be improved on the whole.

The intra-frame encoding in H.264/AVC is taken as an example to describe the video data encoding method provided in this embodiment.

Step 1: In the intra-frame encoding process in the H.264/AVC, for each macro block, the macro block is encoded through the existing I4MB mode, I16MB mode, and I8MB mode first, the bit rate of each mode is recorded as R_I4MB, R_I16MB, and R_I8MB respectively, and the distortion is recorded as D_I4MB, D_I16MB, and D_I8MB respectively; afterward, the rate distortion cost is calculated respectively: RDcost_I4MB=D_I4MB+λ*R_I4MB, RDcost_I16MB=D_I16MB+λ*R_I16MB, and RDcost_I8MB=D_I16MB+λ*R_I8MB, where λ is a specified constant in the encoding process. Afterward, a new macro block encoding mode, namely, the method provided in this embodiment, is applied. Assuming that the macro block is encoded in an I4MB_RDOT mode, an I16MB_RDOT mode, and an I8MB_RDOT mode, and the corresponding rate-distortion costs, namely, RDcost_I4MB_RDOT, RDcost_I16MB_RDOT, and RDcost_I8MB_RDOT, are calculated.

The encoding processes of the I4MB_RDOT, I16MB_RDOT, and I8MB_RDOT are described below.

Figure 3:
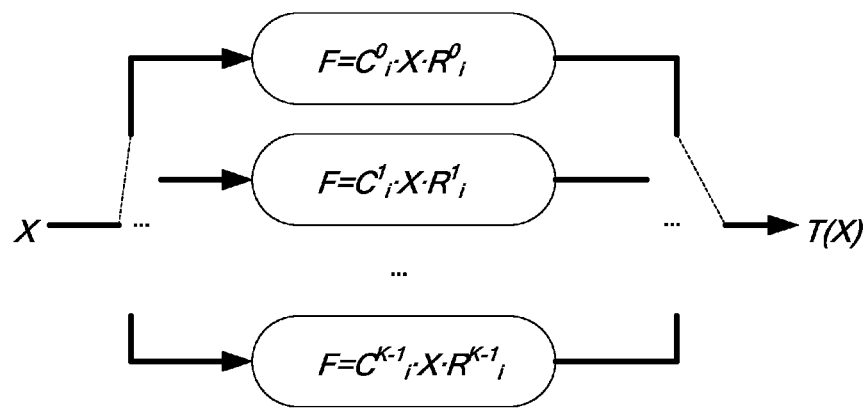
FIG. 3 is a schematic diagram of residual change in a video encoding method according to an embodiment of the present invention.

(a) When the macro block is encoded in the I4MB_RDOT mode, like in an I4MB coding process, a 16×16 macro block is divided into 16 non-overlapping subblocks of a 4×4 size. Afterward, the best prediction direction is selected for each subblock. This step is different from the I4MB encoding process in that: at the time of transforming the residual, multiple sets of candidate transformation matrixes are selected according to a current intra-frame prediction mode, and transform-coding is performed on the residual; the bit rate R and the distortion D corresponding to different transformation matrix combinations are recorded, and the rate distortion cost is calculated; and the transformation matrix combination with the minimum rate-distortion cost is selected as a best combination, and is used for actual encoding of the residual data. For the residual transformation process, see FIG. 3, in which, X is a prediction residual, T(X) is the transformed prediction residual, and $C_i^{0 \cdots K-1}$ and $R_i^{0 \cdots K-1}$ are candidate transformation matrixes corresponding to the prediction direction.

(b) When the macro block is encoded in the I8MB_RDOT mode, like in an I8MB coding process, a 16×16 macro block is divided into 4 non-overlapping subblocks of an 8×8 size. Afterward, the best prediction direction is selected for each subblock. This step is different from the I8MB encoding process in that: at the time of transforming the residual, multiple sets of candidate transformation matrixes are selected according to the current intra-frame prediction mode, and transform-coding is performed on the residual; the bit rate R and the distortion D corresponding to different transformation matrix combinations are recorded, and the rate distortion cost is calculated; and the transformation matrix combination with the minimum rate-distortion cost is selected as a best combination, and is used for actual encoding of the residual data. For the residual transformation process, see FIG. 6, in which, X is a prediction residual, T(X) is the transformed prediction residual, and $C_i^{0;-K-1}$ and $R_i^{0;-K-1}$ are candidate transformation matrixes corresponding to the prediction direction.

(c) At the time of encoding the macro block in the I16MB_RDOT mode, like in the I16MB encoding process, the best prediction direction is selected for each 16×16 block. This step is different from the I16MB encoding process in that: at the time of transforming the residual, a given set of candidate transformation matrixes are selected according to the prediction direction, and all possible combinations of the column transformation matrixes and row transformation matrixes in the set of candidate transformation matrixes are traversed; the bit rate R and the distortion D corresponding to different transformation matrix combinations are recorded respectively, and the rate distortion cost is calculated; and the transformation matrix combination with the minimum rate-distortion cost is selected as a best combination, and is used for actual encoding of the residual data.

Step 2: When the macro block encoding mode is I4MB_RDOT, I16MB_RDOT, or I8MB_RDOT, a corresponding coefficient scan order is selected for the transformed residual of each subblock according to the intra-frame prediction mode and the transformation matrix.

Step 3: The mode with the minimum rate-distortion cost is selected as the best macro block encoding mode according to the rate-distortion costs corresponding to the four intra-frame macro block encoding modes I4MB, I16MB, I8MB, I4MB_RDOT, I16MB_RDOT, and I8MB_RDOT which are obtained in step 1. If the best macro block encoding mode is I4MB, I16MB, or I8MB, in the entropy encoding for the macro block header information, a syntax element RDOT_ON is written after a syntax element CBP, and a value assigned to the syntax element RDOT_ON is 0, indicating that the technology put forward is not used. If the best macro block mode is I4MB_RDOT, I16MB_RDOT, or I8MB_RDOT, in the entropy encoding for the macro block header information, the syntax element RDOT_ON is written after the syntax element CBP, and a value assigned to the syntax element RDOT_ON is 1, indicating that the technology put forward is used. Moreover, the transformation matrix index number used by each block of the current macro block is written after the syntax element RDOT_ON through entropy encoding sequentially.

Specifically, the syntax change made by this embodiment for the H.264 video encoding standard is shown in Table 1. In each macro block header, the syntax element RDOT_ON is written after the existing syntax element CBP. If the macro block mode is I4MB, I16MB, or I8MB, the value of RDOT_ON is 0; or, if the macro block mode is I4MB_RDOT, I16MB_RDOT, or I8MB_RDOT, the value of RDOT_ON is 1. If the value of RDOT_ON is 1, namely, the macro block mode is I4MB_RDOT, I16MB_RDOT, or I8MB_RDOT, the syntax element Transform_matrix_index (transformation matrix index) is written after the syntax element RDOT_ON, where the syntax element Transform_matrix_index includes the index number of the transformation matrix selected by each block in the macro block.

TABLE 1

Syntax elements of I4MB, I8MB and I6MB modes

| | | |
|---|---|---|
| MB mode (MB mode) | I4MB | I4MB_RDOT |
| Syntax Element (Syntax Element) | MB_TYPE = 9 Transform_size_flag Intra_4x4_mode Chroma_intra_mode CBP RDOT_ON = 0 Delta_QP Luma_Coeff Chroma_Coeff | MB_TYPE = 9 Transform_size_flag Intra_4x4_mode Chroma_intra_mode CBP RDOT_ON = 1 Transform_matrix_index Delta_QP Luma_Coeff Chroma_Coeff |
| MB mode (MB mode) | I8MB | I8MB_RDOT |

TABLE 1-continued

Syntax elements of I4MB, I8MB and I6MB modes

| | | |
|---|---|---|
| Syntax Element (Syntax Element) | MB_TYPE = 9 Transform_size_flag Intra_8x8_mode Chroma_intra_mode CBP RDOT_ON = 0 Delta_QP Luma_Coeff Chroma_Coeff | MB_TYPE = 9 Transform_size_flag Intra_8x8_mode Chroma_intra_mode CBP RDOT_ON = 1 Transform_matrix_index Delta_QP Luma_Coeff Chroma_Coeff |
| MB mode (MB mode) | I16MB | I16MB_RDOT |
| Syntax Element (Syntax Element) | MB_TYPE = 10 Chroma_intra_mode RDOT_ON = 0 Delta_QP Luma_Coeff Chroma_Coeff | MB_TYPE = 10 Chroma_intra_mode RDOT_ON = 1 Transform_matrix_index Delta_QP Luma_Coeff Chroma_Coeff |
| MB mode (MB mode) | I4MB | I4MB_RDOT |
| Syntax Element (Syntax Element) | MB_TYPE = 9 Transform_size_flag Intra_4x4_mode Chroma_intra_mode CBP RDOT_ON = 0 Delta_QP Luma_Coeff Chroma_Coeff | MB_TYPE = 9 Transform_size_flag Intra_4x4_mode Chroma_intra_mode CBP RDOT_ON = 1 Transform_matrix_index Delta_QP Luma_Coeff Chroma_Coeff |
| MB mode (MB mode) | I16MB | I16MB_RDOT |
| Syntax Element (Syntax Element) | MB_TYPE = 10 Chroma_intra_mode RDOT_ON = 0 Delta_QP Luma_Coeff Chroma_Coeff | MB_TYPE = 10 Chroma_intra_mode RDOT_ON = 1 Transform_matrix_index Delta_QP Luma_Coeff Chroma_Coeff |

Finally, the KTA2.4 is used as a platform, and the following settings are applied: full I-frame encoding, CABAC, and 4 QP points tested for each sequence being 22, 27, 32, and 37. The encoding performance based on the method provided in this embodiment of the present invention is compared with the encoding performance based on the MDDT in the prior art, and the average ΔPSNR is calculated.

Table 2 shows the measured results of the QCIF sequence.

TABLE 2

Measured results of the QCIF sequence

| Sequence | Format | ΔPSNR(dB) |
|---|---|---|
| Bus | QCIF | 0.2603 |
| Football | QCIF | 0.1662 |
| Tempete | QCIF | 0.2423 |
| Coastguard | QCIF | 0.1498 |
| Container | QCIF | 0.2036 |
| Foreman | QCIF | 0.083 |
| Hall | QCIF | 0.2408 |
| Mother | QCIF | 0.0519 |
| Silent | QCIF | 0.1113 |
| Paris | QCIF | 0.2400 |

Table 3 shows the measured results of the CIF sequence.

TABLE 3

Measured results of the CIF sequence

| Sequence | Format | ΔPSNR(dB) |
|---|---|---|
| Flower | CIF | 0.2596 |
| Mobile | CIF | 0.3146 |
| Paris | CIF | 0.1717 |
| Stefan | SIF | 0.2767 |
| Bus | CIF | 0.2398 |
| Coastguard | CIF | 0.1469 |
| Container | CIF | 0.1911 |
| Football | CIF | 0.1017 |
| Foreman | CIF | 0.0740 |
| Hall | CIF | 0.2123 |
| Silent | CIF | 0.0900 |
| Tempete | CIF | 0.1070 |

The foregoing table shows that the method provided in this embodiment improves performance obviously, as compared with the MDDT transformation method.

The following analyzes the complexity of the method provided in this embodiment.

The following analyzes luminance.

On the decoder side, the complexity of the method disclosed in this embodiment differs from the complexity of the MDDT transformation method in the following two aspects:

(1) With regard to the method provided in this embodiment, the decoder needs to perform entropy decoding on the syntax element RDOT_ON newly added in each macro block header. If RDOT_ON=1, the decoder further needs to decode the macro block header to obtain the index number of the transformation matrix used by each block in the macro block.

Compared with the MDDT technology, this part of operation increases the complexity that lies in the entropy decoding for the two newly added syntax elements: RDOT_ON flag and the transformation matrix index number. However, the complexity of this part is ignorable relative to the complexity of the whole decoding process.

(2) For a macro block (RDOT_ON=1) to which the method provided in this embodiment is applied, the decoder needs to select a corresponding coefficient scan order and transformation matrix according to the transformation matrix index number obtained through decoding.

This part of operation is as complex as the MDDT technology, but requires additional storage space for storing the candidate transformation matrix and the coefficient scan order. The I4MB mode has 9 prediction directions, and therefore, if 2 candidate row transformation matrixes and 2 candidate column transformation matrixes exist in each direction and every element of the transformation matrix is an integer number that ranges between 0 and 128, the total storage space required is 9×(2+2)×16×7=4032 bits. The I8MB mode has 9 prediction directions, and therefore, if 4 candidate row transformation matrixes and 4 candidate column transformation matrixes exist in each direction and every element of the transformation matrix is an integer number that ranges between 0 and 128, the total storage space required is 9×(4+4)×64×7=32256 bits. Similarly, the I16MB mode has 4 prediction directions, and therefore, if 8 candidate row transformation matrixes and 8 candidate column transformation matrixes exist in each direction, the total storage space required is 4×(8+8)×256×7=114688 bits. Therefore, the total storage space required by I4MB, I16MB, and I8MB is 150976 bits, namely, 18.42 KB. Besides, the space occupied by the array that records the coefficient scan order is far less than the space occupied by the transformation matrix, and is not analyzed here any further.

On the decoder side, the complexity of the method disclosed in this embodiment differs from the complexity of the MDDT transformation method in the following three aspects:

(1) With regard to the method provided in this embodiment, the encoder needs to write the newly added syntax element RDOT_ON into the macro block header information of each macro block through entropy encoding. If RDOT_ON=1, the encoder further needs to perform entropy encoding on the index number of the transformation matrix used by each block in the macro block and write the index number into the macro block header information. Compared with the MDDT technology, this part of operation increases the complexity that lies in the entropy encoding for the two newly added syntax elements: RDOT_ON flag and the transformation matrix index number. The complexity added by this part is ignorable relative to the complexity of the whole encoding process.

(2) With regard to the method disclosed in this embodiment of the present invention, the encoder requires additional storage space for storing the candidate transformation matrix and the coefficient scan order. The required storage space is the same as that on the decoder, and is 18.42 KB.

For intra-frame encoding, the method disclosed in this embodiment reserves the existing macro block encoding modes: I4MB, I16MB, and I8MB, and adds two macro block encoding modes: I4MB_RDOT, I16MB_RDOT, and I8MB_RDOT. For the two newly added macro block encoding modes, the encoder needs to select a best transformation matrix for each residual block.

The video encoding method in this embodiment may select a set of best transformation matrixes among multiple candidate transformation matrixes according to an intra-frame prediction mode and rate-distortion criteria to perform transform-coding on the prediction residual and obtain a transformation result. Through such a mode for encoding, the most efficient transformation matrix corresponding to features of each residual block is selected for transformation, which therefore improves encoding efficiency.

Figure 4:
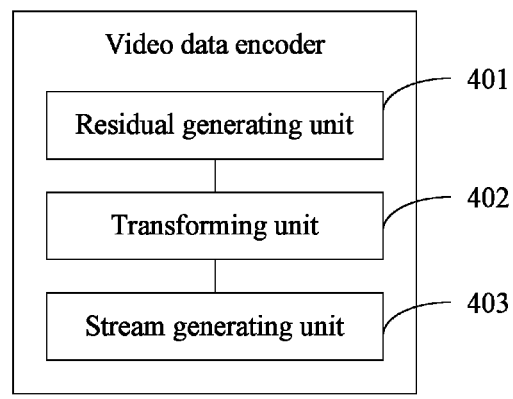
FIG. 4 is a block diagram of a structure of a video encoder according to an embodiment of the present invention.

As shown in FIG. 4, a video data encoder provided in an embodiment of the present invention includes:

a residual generating unit 401, configured to generate a prediction residual according to input video data;

a transforming unit 402, configured to select a set of best transformation matrixes among multiple candidate transformation matrixes according to an intra-frame prediction mode and rate-distortion criteria to perform transform-coding on the prediction residual and obtain a transformation result; and a stream generating unit 403, configured to generate an encoded stream according to the transformation result and selected transformation matrix index information.

The transforming unit 402 is specifically configured to: traverse all combinations of the column transformation matrix and the row transformation matrix in multiple candidate transformation matrixes according to the intra-frame prediction mode, select the transformation combination with the minimum rate-distortion cost after multiplication of the matrixes as a best transformation coefficient matrix, and obtain a transformation result.

Figure 5:
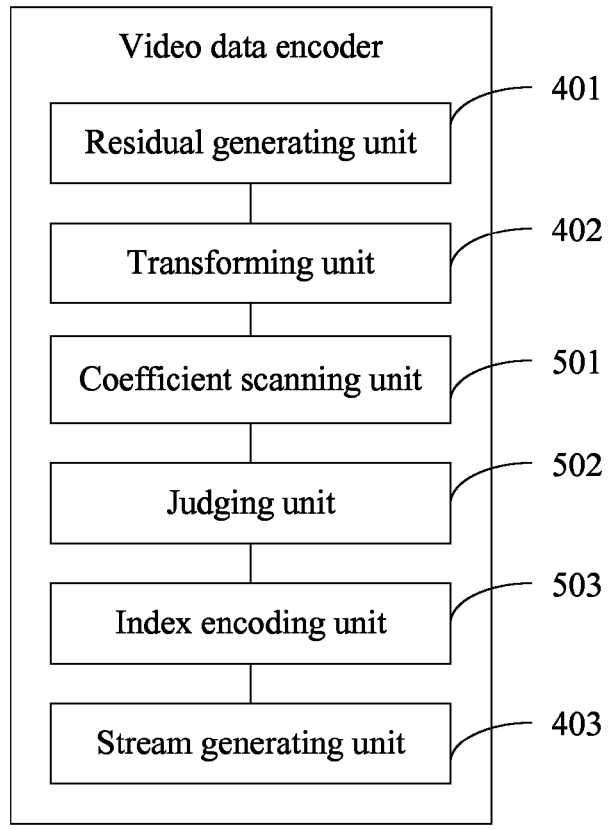
FIG. 5 is a block diagram of a structure of a video encoder according to another embodiment of the present invention.

Further, as shown in FIG. 5, the video data encoder further includes:

a coefficient scanning unit 501, configured to select a scan order of a set of coefficients according to the intra-frame prediction mode and the transformation matrix index information to scan the transformed coefficient;

a judging unit 502, configured to determine the mode with the minimum rate-distortion cost as an intra-frame prediction mode after the prediction residual is encoded in various encoding modes, and obtain an encoding result; and an index encoding unit 503, configured to write the transformation coefficient matrix index information into the encoded data.

The video encoder provided in this embodiment may select a set of best transformation matrixes among multiple candidate transformation matrixes according to an intra-frame prediction mode and rate-distortion criteria to perform transform-coding on the prediction residual and obtain a transformation result. Through such a mode for encoding, the most efficient transformation matrix corresponding to features of each residual block is selected for transformation, which therefore improves encoding efficiency.

The following gives more details about the video decoding method provided in an embodiment of the present invention with reference to FIG. 4 and FIG. 5:

As shown in FIG. 4, a video data encoder provided in an embodiment of the present invention includes:

a residual generating unit 401, configured to generate a prediction residual according to input video data;

a transforming unit 402, configured to select a set of best transformation matrixes among multiple candidate transformation matrixes according to an intra-frame prediction mode and rate-distortion criteria to perform transform-coding on the prediction residual and obtain a transformation result; and a stream generating unit 403, configured to generate an encoded stream according to the transformation result and selected transformation matrix index information.

In this embodiment, the selected set of best transformation matrixes may be a non-separate transformation matrix or may be a pair of transformation matrixes that include a column transformation matrix and a row transformation matrix.

In this embodiment, the transforming unit 402 selects a set of best transformation matrixes among multiple candidate transformation matrixes according to the intra-frame prediction mode and the rate-distortion criteria to perform transform-coding on the prediction residual and obtain a transformation result. In other words, according to the intra-frame prediction mode, transform-coding is performed on the prediction residual by using multiple candidate transformation matrixes, a set of best transformation matrixes are selected according to the rate-distortion criteria, and the transformation result corresponding to the set of best transformation matrixes is used together with the selected transformation matrix index information subsequently to generate an encoded stream.

The transforming unit 402 is specifically configured to: traverse all combinations of the column transformation matrix and the row transformation matrix in multiple candidate transformation matrixes according to the intra-frame prediction mode, select the transformation combination with the minimum rate-distortion cost after multiplication of the matrixes as a best transformation matrix, and obtain a transformation result. In other words, the details are: according to the intra-frame prediction mode, traversing all combinations of the column transformation matrix and the row transformation matrix in multiple candidate transformation matrixes, selecting the transformation combination with the minimum rate-distortion cost after the residual transform-coding as a best transformation matrix, and using the transformation result corresponding to the set of best transformation matrixes together with the selected transformation matrix index information subsequently to generate an encoded stream.

Further, as shown in FIG. 5, the video data encoder further includes:

a coefficient scanning unit 501, configured to select a scan order of a set of coefficients according to the intra-frame prediction mode and the transformation matrix index information to scan the transformed coefficient;

a judging unit 502, configured to determine the mode with the minimum rate-distortion cost as an intra-frame prediction mode after the prediction residual is encoded in various encoding modes, and obtain an encoding result.

an index encoding unit 503, configured to write the transformation matrix index information into the encoded data.

If the set of best transformation matrixes are a pair of transformation matrixes, the writing the transformation matrix index information into the encoded data includes: encoding the index information of a pair of transformation matrixes jointly, or encoding the index information of a pair of transformation matrixes separately, and writing the encoding result of the index information into the encoded data.

Joint encoding indicates that the column transformation matrix and the row transformation matrix appear in pairs, and each row transformation matrix corresponds to a column transformation matrix; separate encoding indicates that a column transformation matrix does not necessarily correspond to a row transformation matrix. For example, a row transformation matrix may correspond to a random column transformation matrix, which may save storage space of the transformation matrixes.

The video encoder provided in this embodiment may select a set of best transformation matrixes among multiple candidate transformation matrixes according to an intra-frame prediction mode and rate-distortion criteria to perform transform-coding on the prediction residual and obtain a transformation result. Through such an encoding mode, the most efficient transformation matrix corresponding to features of each residual block is selected for transformation, which therefore improves encoding efficiency.

Figure 6:
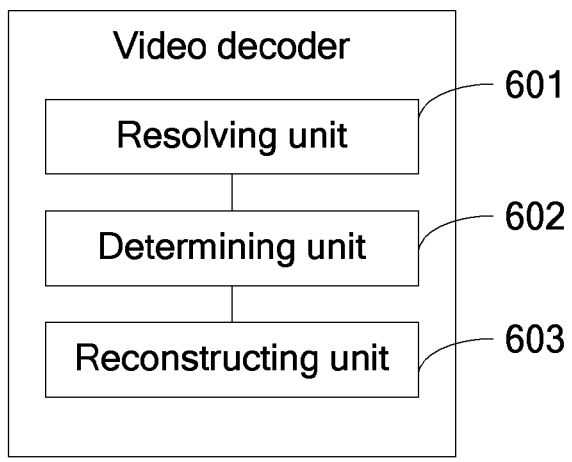
FIG. 6 is a block diagram of a structure of a video decoder according to an embodiment of the present invention.

As shown in FIG. 6, a video decoder provided in an embodiment of the present invention includes:

a resolving unit 601, configured to resolve a video stream to obtain a calculation result and encoding transformation coefficient matrix index information;

a determining unit 602, configured to determine a transformation coefficient matrix among multiple candidate transformation matrixes according to the index information and an intra-frame prediction mode; and a reconstructing unit 603, configured to use the transformation coefficient matrix to perform inverse transformation for the calculation result to obtain residual data, and reconstruct video data according to the residual data.

Figure 7:
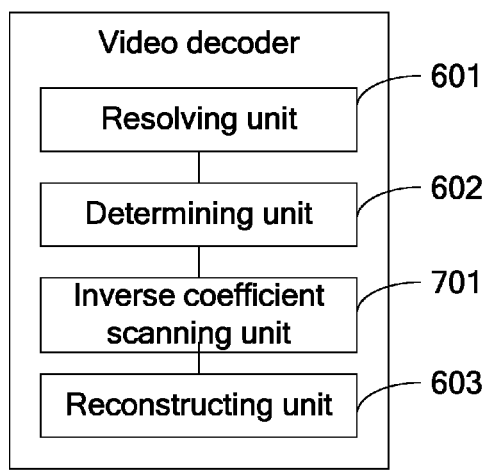
FIG. 7 is a block diagram of a structure of a video decoder according to another embodiment of the present invention.

Further, as shown in FIG. 7, the video decoder also includes:

an inverse coefficient scanning unit 701, configured to select a scan order of a set of coefficients according to the intra-frame prediction mode and the transformation coefficient matrix index information to perform inverse coefficient scanning on the transformed coefficient.

The video decoder provided in this embodiment can resolve the encoded video stream to obtain a calculation result and encoding transformation coefficient matrix index information, determine the transformation coefficient matrix among multiple candidate transformation matrixes according to the index information and the intra-frame prediction mode, the transformation coefficient matrix to perform inverse transformation on the calculation result to obtain residual data, and reconstruct video data according to the residual data. In this way, the decoding is performed without increasing complexity. Because the encoding is based on the method provided in the preceding embodiment, the best transformation matrix can be selected with respect to the residual features, and the entropy encoding efficiency is improved. Further, through the decoding method provided in this embodiment, the efficiency of encoding and decoding videos can be improved on the whole.

The following gives more details about the video decoding method provided in an embodiment of the present invention with reference to FIG. 6 and FIG. 7:

As shown in FIG. 6, a video decoder provided in an embodiment of the present invention includes:

a resolving unit 601, configured to resolve a video stream to obtain a calculation result and transformation matrix index information;

a determining unit 602, configured to determine a transformation matrix among multiple candidate transformation matrixes according to the transformation matrix index information and the intra-frame prediction mode; and a reconstructing unit 603, configured to use the determined transformation matrix to perform inverse transformation on the calculation result to obtain residual data, and reconstruct video data according to the residual data.

In this embodiment, the result obtained after the resolution of the resolving unit 601 includes the transformation result. That is, the calculation result used in this embodiment is the transformation result. The transformation result may include the transformation coefficient matrix obtained after transformation.

In this embodiment, the determined transformation matrix is a set of transformation matrixes, and the set of transformation matrixes may be a non-separate transformation matrix or may be a pair of transformation matrixes that include a column transformation matrix and a row transformation matrix.

If separate transformation is applied in the encoding transformation process, the determining unit 602 is configured to determine the transformation matrix among a set of candidate row transformation matrixes and column transformation matrixes according to the row transformation matrix index information and the column transformation matrix index information in the transformation matrix index information, and the intra-frame prediction mode. The set of candidate row transformation matrixes and column transformation matrixes here may include multiple row transformation matrixes and column transformation matrixes. The reconstructing unit 603 uses the row transformation matrix and the column transformation matrix to perform inverse transformation on the calculation result to obtain residual data, and reconstruct video data according to the residual data.

Further, as shown in FIG. 7, the video decoder includes:

an inverse coefficient scanning unit 701, configured to select a scan order of a set of coefficients according to the intra-frame prediction mode and the transformation matrix index information to perform inverse coefficient scanning on the transformed coefficient.

The video decoder provided in this embodiment can resolve the encoded video stream to obtain a calculation result and transformation matrix index information, determine the transformation matrix among multiple candidate transformation matrixes according to the index information and the intra-frame prediction mode, use the transformation matrix to perform inverse transformation on the calculation result to obtain residual data, and reconstruct video data according to the residual data. In this way, the decoding is performed without increasing complexity. Because the encoding is based on the method provided in the preceding embodiment, the best transformation matrix can be selected with respect to the residual features, and the entropy encoding efficiency is improved. Further, through the decoding method provided in this embodiment, the efficiency of encoding and decoding videos can be improved on the whole.

Figure 8:
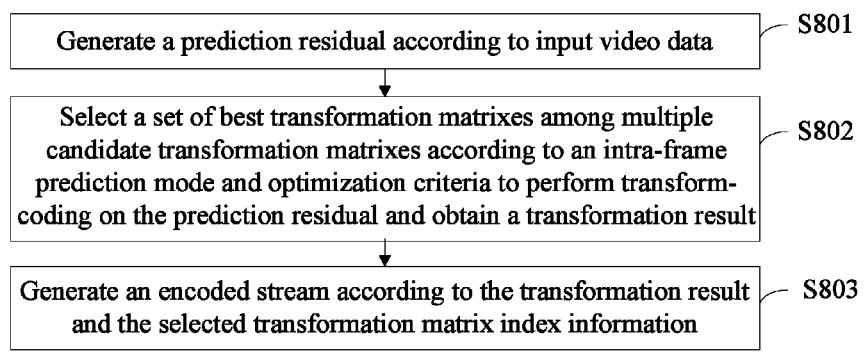
FIG. 8 is a block flowchart of another video encoding method according to an embodiment of the present invention.

Another method for encoding video data is provided in an embodiment of the present invention. As shown in FIG. 8, the method includes the following steps:

S801: Generate a prediction residual according to input video data.

S802: Select a set of best transformation matrixes among multiple candidate transformation matrixes according to an intra-frame prediction mode and optimization criteria to perform transform-coding on the prediction residual and obtain a transformation result.

In this embodiment, the selected set of best transformation matrixes may be a non-separate transformation matrix or may be a pair of transformation matrixes that include a column transformation matrix and a row transformation matrix.

The optimization criteria may be rate-distortion criteria, sum of absolute difference (SAD, Sum of Absolute Difference), code bits, or distortion. The selecting according to the optimization criteria may include many ways, for example, selecting the one with the minimum rate-distortion cost, selecting the one with the minimum SAD, selecting the one with the least code bits, or selecting the one with the minimum distortion.

In this embodiment, a set of best transformation matrixes are selected among multiple candidate transformation matrixes according to the intra-frame prediction mode and the optimization criteria to perform transform-coding on the prediction residual and obtain a transformation result. In other words, according to the intra-frame prediction mode, transform-coding is performed on the prediction residual by using multiple candidate transformation matrixes, a set of best transformation matrixes are selected according to the optimization criteria, and the transformation result corresponding to the set of best transformation matrixes is used together with the selected transformation matrix index information subsequently to generate an encoded stream.

In certain implementation modes, in the process of transformation, the mode of separating the column from the row may be applied. That is: according to the intra-frame prediction mode, traversing all possible combinations of the column transformation matrix and the row transformation matrix in multiple candidate transformation matrixes, selecting the transformation combination with the minimum optimization criteria cost after the residual transform-coding as a best transformation matrix, and obtaining a transformation result. In other words, the details are: according to the intra-frame prediction mode, traversing all combinations of the column transformation matrix and the row transformation matrix in multiple candidate transformation matrixes, selecting the transformation combination with the minimum optimization criteria cost after the residual transform-coding as a best transformation matrix, and using the transformation result corresponding to the set of best transformation matrixes together with the selected transformation matrix index information subsequently to generate an encoded stream.

S803: Generate an encoded stream according to the transformation result and selected transformation matrix index information.

Further, this embodiment may also include a coefficient scanning process: selecting a scan order of a set of coefficients according to the intra-frame prediction mode and the transformation matrix index information to scan the transformed coefficient.

Then, the one with the minimum optimization criteria cost after the transformation is selected as the best intra-frame prediction mode, and its result is quantized and then undergoes entropy encoding. That is, the prediction residual is encoded in various encoding modes, the mode with the minimum optimization criteria cost is selected as the intra-frame prediction mode, and an encoding result is obtained.

In this embodiment, the generating of the encoded stream according to the transformation result and the selected transformation matrix index information includes: writing the transformation matrix index information into the encoded data.

If the set of best transformation matrixes are a pair of transformation matrixes, the writing of the transformation matrix index information into the encoded data includes: encoding the index information of a pair of transformation matrixes jointly, or encoding the index information of a pair of transformation matrixes separately, and writing the encoding result of the index information into the encoded data.

Joint encoding indicates that the column transformation matrix and the row transformation matrix appear in pairs, and each row transformation matrix corresponds to a column transformation matrix; separate encoding indicates that a column transformation matrix does not necessarily correspond to a row transformation matrix. For example, a row transformation matrix may correspond to a random column transformation matrix, which may save storage space of the transformation matrixes.

According to the video encoding method in this embodiment, a set of best transformation matrixes can be selected among multiple candidate transformation matrixes according to an intra-frame prediction mode and optimization criteria to perform transform-coding on the prediction residual and obtain a transformation result. Through such an encoding mode, the most efficient transformation matrix corresponding to features of each residual block is selected for transformation, which therefore improves encoding efficiency.

Figure 9:
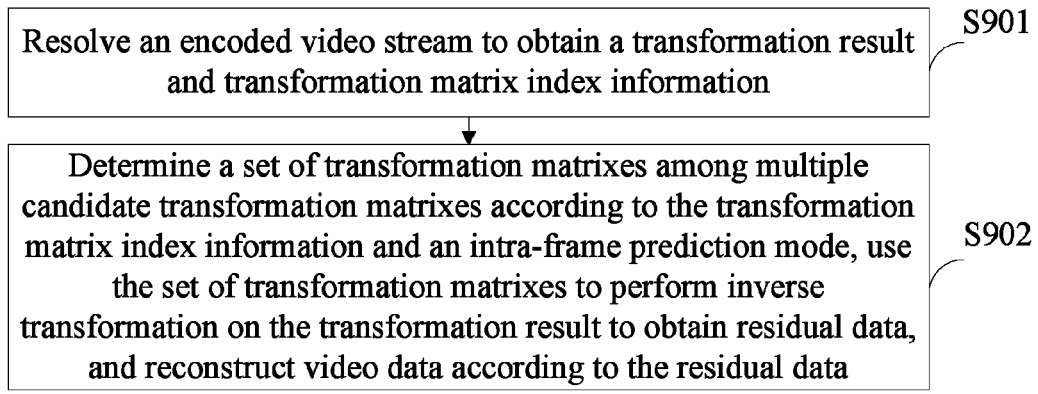
FIG. 9 is a block flowchart of another video decoding method according to an embodiment of the present invention.

Another video decoding method is provided in an embodiment of the present invention. As shown in FIG. 9, the method includes the following steps:

S901: Resolve an encoded video stream to obtain a transformation result and transformation matrix index information.

Further, this embodiment also includes an inverse coefficient scanning process: selecting a scan order of a set of coefficients according to the intra-frame prediction mode and the transformation matrix index information to perform inverse coefficient scanning on the transformed coefficient.

S902: Determine a set of transformation matrixes among multiple candidate transformation matrixes according to the transformation matrix index information and an intra-frame prediction mode, use the set of transformation matrixes to perform inverse transformation on the transformation result to obtain residual data, and reconstruct video data according to the residual data.

In this embodiment, the determined set of transformation matrixes may be a non-separate transformation matrix or may be a pair of transformation matrixes that include a column transformation matrix and a row transformation matrix.

In this embodiment, the result obtained after resolution includes the transformation result. That is, the transformation result used in this embodiment is the calculation result. The transformation result may include the transformation coefficient matrix obtained after transformation.

Specifically, if separate transformation is applied in the encoding transformation process, the set of transformation matrixes in step S902 may be determined among multiple candidate row transformation matrixes and column transformation matrixes according to the row transformation matrix index information and the column transformation matrix index information in the transformation matrix index information, and the intra-frame prediction mode.

According to the video decoding method provided in this embodiment, the encoded video stream can be resolved to obtain a transformation result and transformation matrix index information, a set of transformation matrixes is determined among multiple candidate transformation matrixes according to the transformation matrix index information and the intra-frame prediction mode, the transformation matrix is used to perform inverse transformation for the transformation result to obtain residual data, and video data is reconstructed according to the residual data. In this way, the decoding is performed without increasing complexity. Because the encoding is based on the method provided in the preceding embodiment, the best transformation matrix can be selected with respect to the residual features, and the entropy encoding efficiency is improved. Further, through the decoding method provided in this embodiment, the efficiency of encoding and decoding videos can be improved on the whole.

Figure 10:
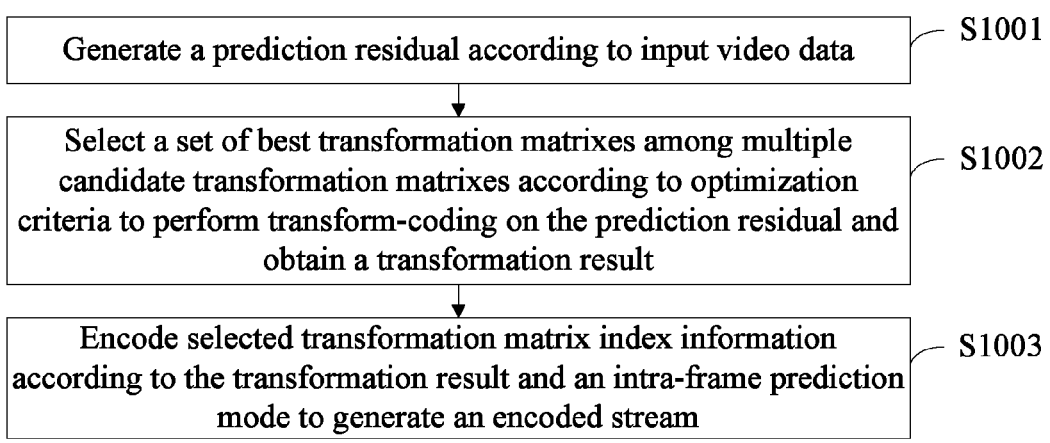
FIG. 10 is a block flowchart of another video encoding method according to an embodiment of the present invention.

As shown in FIG. 10, a method for encoding video data in an embodiment of the present invention includes the following steps:

S1001: Generate a prediction residual according to input video data.

S1002: Select a set of best transformation matrixes among multiple candidate transformation matrixes according to optimization criteria to perform transform-coding on the prediction residual and obtain a transformation result.

In this embodiment, the selected set of best transformation matrixes may be a non-separate transformation matrix or may be a pair of transformation matrixes that include a column transformation matrix and a row transformation matrix.

The optimization criteria may be rate-distortion criteria, sum of absolute difference (SAD, Sum of Absolute Difference), code bits, or distortion. The selecting according to the optimization criteria may include many ways, for example, selecting the one with the minimum rate-distortion cost, selecting the one with the minimum SAD, selecting the one with the least code bits, or selecting the one with the minimum distortion.

In this embodiment, a set of best transformation matrixes are selected among multiple candidate transformation matrixes according to the optimization criteria to perform transform-coding on the prediction residual and obtain a transformation result. In other words, transform-coding is performed on the prediction residual by using multiple candidate transformation matrixes, a set of best transformation matrixes are selected according to the optimization criteria, and the transformation result corresponding to the set of best transformation matrixes is used together with the selected transformation matrix index information subsequently to generate an encoded stream.

In certain implementation modes, in the process of transformation, the mode of separating the column from the row may also be applied. That is: traversing all possible combinations of the column transformation matrix and the row transformation matrix in multiple candidate transformation matrixes, selecting the transformation combination with the minimum optimization criteria cost after the residual transform-coding as a best transformation matrix, and obtaining a transformation result. In other words, the details are: traversing all combinations of the column transformation matrix and the row transformation matrix in multiple candidate transformation matrixes, selecting the transformation combination with the minimum optimization criteria cost after the residual transform-coding as a best transformation matrix, and using the transformation result corresponding to the set of best transformation matrixes together with the selected transformation matrix index information subsequently to generate an encoded stream.

S1003: Encode selected transformation matrix index information according to the transformation result and an intra-frame prediction mode to generate an encoded stream.

Further, this embodiment may also include a coefficient scanning process: selecting a scan order of a set of coefficients according to the transformation matrix index information to scan the transformed coefficient.

Then, the one with the minimum optimization criteria cost after the transformation is selected as the best intra-frame prediction mode, and its result is quantized and then undergoes entropy encoding. That is, the prediction residual is encoded in various encoding modes, the mode with the minimum optimization criteria cost is selected as the intra-frame prediction mode, and an encoding result is obtained.

In this embodiment, the encoding the selected transformation matrix index information according to the transformation result and the intra-frame prediction mode to generate the encoded stream includes: selecting, according to the selected intra-frame prediction mode, a method for encoding the transformation matrix index information, to write the transformation matrix index information into the encoded data. For different intra-frame prediction modes, different methods for encoding the transformation matrix index information may be selected to write the transformation matrix index information into the encoded data. If the set of best transformation matrixes are a pair of transformation matrixes, the writing the transformation matrix index information into the encoded data includes: encoding the index information of a pair of transformation matrixes jointly, or encoding the index information of a pair of transformation matrixes separately, and writing the encoding result of the index information into the encoded data according to the intra-frame prediction mode.

Joint encoding indicates that the column transformation matrix and the row transformation matrix appear in pairs, and each row transformation matrix corresponds to a column transformation matrix; separate encoding indicates that a column transformation matrix does not necessarily correspond to a row transformation matrix. For example, a row transformation matrix may correspond to a random column transformation matrix, which may save storage space of the transformation matrixes.

According to the video encoding method provided in this embodiment, a set of best transformation matrixes can be selected among multiple candidate transformation matrixes according to the optimization criteria to perform transform-coding on the prediction residual and obtain a transformation result. Through such a mode for encoding, the most efficient transformation matrix corresponding to features of each residual block is selected for transformation, which therefore improves encoding efficiency.

Figure 11:
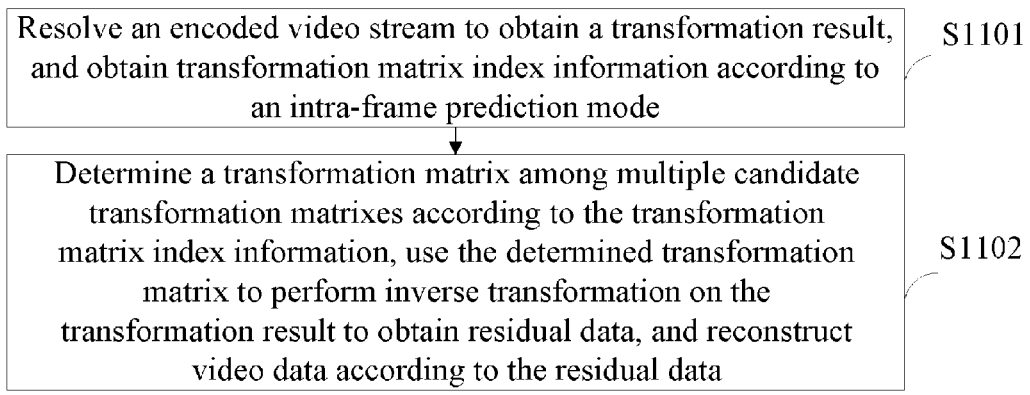
FIG. 11 is a block flowchart of another video decoding method according to an embodiment of the present invention.

As shown in FIG. 11, a video decoding method provided in an embodiment of the present invention includes the following steps:

S1101: Resolve an encoded video stream to obtain a transformation result, and obtain transformation matrix index information according to an intra-frame prediction mode.

In this embodiment, the result obtained after resolution includes the transformation result. That is, the transformation result used in this embodiment is the calculation result. The transformation result may include the transformation coefficient matrix obtained after transformation. The obtaining the transformation matrix index information according to the intra-frame prediction mode includes: selecting, according to the intra-frame prediction mode, a method for decoding the transformation matrix index information, and obtaining the transformation matrix index information through decoding. For different intra-frame prediction modes, different resolution methods may be applied to resolve the video stream and obtain the transformation matrix index information.

Further, this embodiment also includes an inverse coefficient scanning process: selecting a scan order of a set of coefficients according to the transformation matrix index information to perform inverse coefficient scanning on the transformed coefficient.

S1102: Determine a transformation matrix among multiple candidate transformation matrixes according to the transformation matrix index information, use the determined transformation matrix to perform inverse transformation on the transformation result to obtain residual data, and reconstruct video data according to the residual data.

In this embodiment, the determined transformation matrix may be a set of transformation matrixes, and the set of transformation matrixes may be a non-separate transformation matrix or may be a pair of transformation matrixes that include a column transformation matrix and a row transformation matrix.

Specifically, if separate transformation is applied in the decoding transformation process, the transformation matrix in step S1102 may be determined among a set of candidate row transformation matrixes and column transformation matrixes according to the row transformation matrix index information and the column transformation matrix index information in the index information. The set of candidate row transformation matrixes and column transformation matrixes here include multiple row transformation matrixes and column transformation matrixes.

According to the video decoding method provided in this embodiment, the encoded video stream can be resolved to obtain a transformation result, and the transformation matrix index information is obtained through resolving according to the intra-frame prediction mode; a transformation matrix is determined among multiple candidate transformation matrixes according to the transformation matrix index information, the transformation matrix is used to perform inverse transformation on the transformation result to obtain residual data, and video data is reconstructed according to the residual data. In this way, the decoding is performed without increasing complexity. Because the encoding is based on the method provided in the preceding embodiment, the best transformation matrix can be selected with respect to the residual features, and the entropy encoding efficiency is improved. Further, through the decoding method provided in this embodiment, the efficiency of encoding and decoding videos can be improved on the whole.

Figure 12:
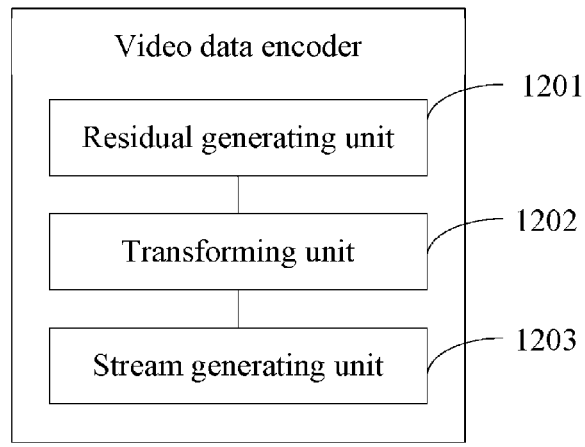
FIG. 12 is a block diagram of a structure of another video encoder according to an embodiment of the present invention.

As shown in FIG. 12, a video data encoder provided in an embodiment of the present invention includes:

a residual generating unit 1201, configured to generate a prediction residual according to input video data;

a transforming unit 1202, configured to select a set of best transformation matrixes among multiple candidate transformation matrixes according to optimization criteria to perform transform-coding on the prediction residual and obtain a transformation result; and a stream generating unit 1203, configured to encode selected transformation matrix index information according to the transformation result and an intra-frame prediction mode to generate an encoded stream.

In this embodiment, the selected set of best transformation matrixes may be a non-separate transformation matrix or may be a pair of transformation matrixes that include a column transformation matrix and a row transformation matrix. The optimization criteria include: rate-distortion criteria, sum of absolute difference (SAD), code bits, or distortion.

In this embodiment, the transforming unit 1202 is specifically configured to: traverse all combinations of the column transformation matrix and the row transformation matrix in multiple candidate transformation matrixes, select the transformation combination with the minimum optimization criteria cost after the residual transform-coding as a best transformation matrix, and obtain a transformation result.

In this embodiment, the encoding, by the stream generating unit 1203, the selected transformation matrix index information according to the transformation result and the intra-frame prediction mode to generate the encoded stream, includes: selecting, according to the selected intra-frame prediction mode, a method for encoding the transformation matrix index information, to write the transformation matrix index information into the encoded data.

Figure 13:
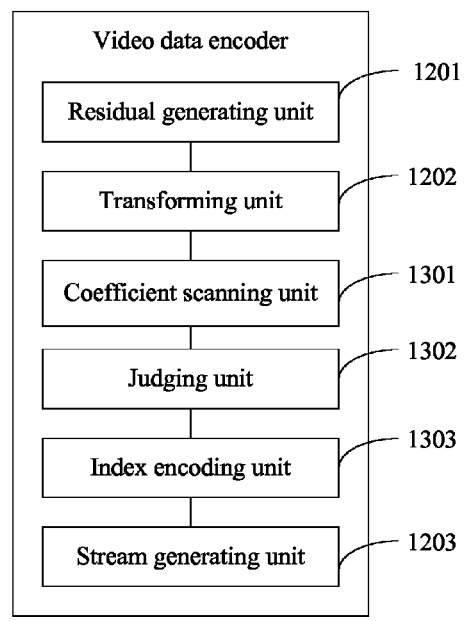
FIG. 13 is a block diagram of a structure of another video encoder according to an embodiment of the present invention.

Further, as shown in FIG. 13, the video data encoder further includes:

a coefficient scanning unit 1301, configured to select a scan order of a set of coefficients according to the transformation matrix index information to scan the transformed coefficient;

a judging unit 1302, configured to determine the mode with the minimum optimization criteria cost as an intra-frame prediction mode after the prediction residual is encoded in various encoding modes, and obtain an encoding result; and an index encoding unit 1303, configured to select, according to the selected intra-frame prediction mode, a method for encoding the transformation matrix index information, to write the transformation matrix index information into the encoded data.

If the set of best transformation matrixes are a pair of transformation matrixes, the selecting, according to the selected intra-frame prediction mode, a method for encoding the transformation matrix index information, to write the transformation matrix index information into the encoded data, includes: encoding the index information of a pair of transformation matrixes jointly, or encoding the index information of a pair of transformation matrixes separately, and selecting a method for encoding the transformation matrix index information according to the selected intra-frame prediction mode to write the transformation matrix index information into the encoded data.

Joint encoding indicates that the column transformation matrix and the row transformation matrix appear in pairs, and each row transformation matrix corresponds to a column transformation matrix; separate encoding indicates that a column transformation matrix does not necessarily correspond to a row transformation matrix. For example, a row transformation matrix may correspond to a random column transformation matrix, which may save storage space of the transformation matrixes.

The video encoder provided in this embodiment may select a set of best transformation matrixes among multiple candidate transformation matrixes according to the optimization criteria to perform transform-coding on the prediction residual and obtain a transformation result. Through such a mode for encoding, the most efficient transformation matrix corresponding to features of each residual block is selected for transformation, which therefore improves encoding efficiency.

The video encoder provided in this embodiment may select a set of best transformation matrixes among multiple candidate transformation matrixes according to an intra-frame prediction mode and rate-distortion criteria to perform transform-coding on the prediction residual and obtain a transformation result. Through such a mode for encoding, the most efficient transformation matrix corresponding to features of each residual block is selected for transformation, which therefore improves encoding efficiency.

Figure 14:
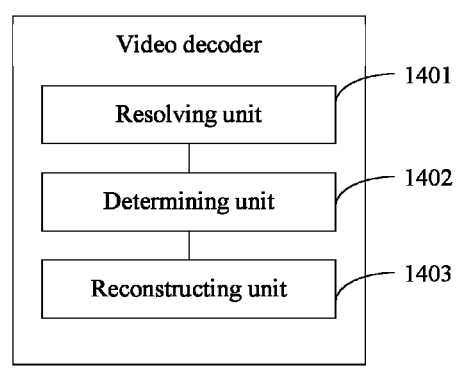
FIG. 14 is a block diagram of a structure of another video decoder according to an embodiment of the present invention.

As shown in FIG. 14, a video decoder provided in an embodiment of the present invention includes:

a resolving unit 1401, configured to resolve a video stream to obtain a transformation result, and obtain transformation matrix index information according to an intra-frame prediction mode;

a determining unit 1402, configured to determine a transformation matrix among multiple candidate transformation matrixes according to the transformation matrix index information; and a reconstructing unit 1403, configured to use the determined transformation matrix to perform inverse transformation on the transformation result to obtain residual data, and reconstruct video data according to the residual data.

In this embodiment, the determined transformation matrix is a set of transformation matrixes, and the set of transformation matrixes may be a non-separate transformation matrix or may be a pair of transformation matrixes that include a column transformation matrix and a row transformation matrix.

In this embodiment, the result obtained after resolution includes the transformation result. That is, the transformation result used in this embodiment is the calculation result. The transformation result may include the transformation coefficient matrix obtained after transformation.

The obtaining, by the resolving unit 1401, the transformation matrix index information according to the intra-frame prediction mode, includes: selecting a method for decoding the transformation matrix index information according to the intra-frame prediction mode, and obtaining the transformation matrix index information through decoding.

Figure 15:
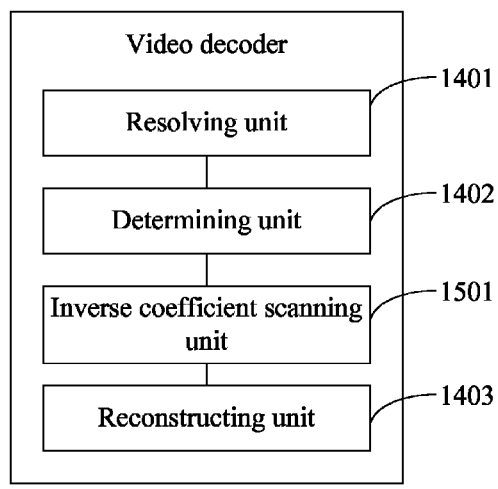
FIG. 15 is a block diagram of a structure of another video decoder according to an embodiment of the present invention.

Further, as shown in FIG. 15, the video decoder includes:

an inverse coefficient scanning unit 1501, configured to select a scan order of a set of coefficients according to the transformation matrix index information to perform inverse coefficient scanning on the transformed coefficient.

The video decoder provided in this embodiment may resolve the encoded video stream to obtain a transformation result, and obtain the transformation matrix index information through resolving according to the intra-frame prediction mode; determine a transformation matrix among multiple candidate transformation matrixes according to the transformation matrix index information, use the transformation matrix to perform inverse transformation on the transformation result to obtain residual data, and reconstruct video data according to the residual data. In this way, the decoding is performed without increasing complexity. Because the encoding is based on the method provided in the preceding embodiment, the best transformation matrix can be selected with respect to the residual features, and the entropy encoding efficiency is improved. Further, through the decoding method provided in this embodiment, the efficiency of encoding and decoding videos may be improved on the whole.

Persons skilled in the art should understand that all or a part of the steps of the method according to the embodiments of the present invention may be implemented by a program instructing relevant hardware. The program may be stored in computer readable storage media. When the program runs, the program executes the steps of the method specified in the foregoing embodiments of the present invention. The storage media may be any media capable of storing program codes, such as ROM, RAM, magnetic disk, or optical disk.

The above descriptions are merely preferred embodiments of the present invention, but not intended to limit the protection scope of the present invention. Any modifications, variations or replacement that may be easily derived by those skilled in the art without departing from the spirit of the present invention shall fall within the protection scope of the present invention. Therefore, the protection scope of the present invention is subject to the appended claims.

What is claimed is:

1. A method for encoding video data, comprising:
generating a prediction residual according to input video data;
performing transform-coding on the prediction residual using a plurality of candidate transformation matrices and obtaining a transformation result for each of the plurality of candidate transformation matrices;
selecting a set of best transformation matrices among the plurality of candidate transformation matrices according to optimization criteria; and
encoding a selected transformation matrix index according to the transformation result corresponding to the set of best transformation matrices and an intra-frame prediction mode to generate an encoded stream.

2. The method for encoding video data according to claim 1, wherein:

the set of best transformation matrices is a non-separate transformation matrix; or the set of best transformation matrices are a pair of transformation matrices that comprise a column transformation matrix and a row transformation matrix.

3. The method for encoding video data according to claim 1, wherein:

the optimization criteria comprise: rate-distortion criteria, sum of absolute difference (SAD), code bits, or distortion.

4. The method for encoding video data according to claim 1, further comprising:

selecting a scan order of a set of coefficients according to the transformation matrix index to scan a transformed coefficient.

5. The method for encoding video data according to claim 1, further comprising:

encoding the prediction residual in various encoding modes, selecting a mode with a minimum optimization criteria cost as the intra-frame prediction mode, and obtaining an encoding result.

6. The method for encoding video data according to claim 1, wherein: the encoding the selected transformation matrix index according to the transformation result and the intra-frame prediction mode to generate the encoded stream comprises:

selecting a method for encoding the transformation matrix index according to a selected intra-frame prediction mode to write the transformation matrix index into the encoded data.

7. The method for encoding video data according to claim 6, wherein: if the set of best transformation matrices are a pair of transformation matrices, the selecting a method for encoding the transformation matrix index according to the selected intra-frame prediction mode to write the transformation matrix index into the encoded data comprises:

encoding index of a pair of transformation matrices jointly, or encoding index of a pair of transformation matrices separately; and selecting a method for encoding the transformation matrix index according to the selected intra-frame prediction mode to write the transformation matrix index into the encoded data.

8. The method for encoding video data according to claim 1, wherein: the selecting a set of best transformation matrices among the plurality of candidate transformation matrices according to the optimization criteria to perform transform-coding on the prediction residual and obtain a transformation result comprises:

traversing all combinations of a column transformation matrix and a row transformation matrix in the plurality of candidate transformation matrices, selecting a transformation combination with a minimum optimization criteria cost after residual transform-coding as a best transformation matrix, and obtaining a transformation result.

9. A video decoding method, comprising:

resolving an encoded video stream to obtain a transformation result, and obtaining a transformation matrix index according to an intra-frame prediction mode; and determining a transformation matrix among a plurality of candidate transformation matrices according to the transformation matrix index, using the determined transformation matrix to perform inverse transformation on the transformation result to obtain residual data, and reconstructing video data according to the residual data.

10. The video decoding method according to claim 9, wherein:

the determined transformation matrix is a non-separate transformation matrix; or the determined transformation matrix is a pair of transformation matrices that comprise a column transformation matrix and a row transformation matrix.

11. The video decoding method according to claim 9, wherein the obtaining the transformation matrix index according to the intra-frame prediction mode comprises:

selecting a method for decoding the transformation matrix index according to the intra-frame prediction mode to obtain the transformation matrix index.

12. The video decoding method according to claim 9, further comprising:

selecting a scan order of a set of coefficients according to the transformation matrix index to perform inverse coefficient scanning on a transformed coefficient.

13. The video decoding method according to claim 9, wherein:

the transformation matrix is determined among a set of candidate row transformation matrices and column transformation matrices according to row transformation matrix index information and column transformation matrix index in the transformation matrix index.

14. A video data encoder, comprising:

a hardware processor configured to:

generate a prediction residual according to input video data;

perform transform-coding on the prediction residual using a plurality of candidate transformation matrices and obtain a transformation result for each of the plurality of candidate transformation matrices;

select a set of best transformation matrices among the plurality of candidate transformation matrices according to optimization criteria; and encode a selected transformation matrix index according to the transformation result corresponding to the set of best transformation matrices and an intra-frame prediction mode to generate an encoded stream.

15. The video data encoder according to claim 14, the hardware processor further configured to select a scan order of a set of coefficients according to the transformation matrix index to scan a transformed coefficient.

16. The video data encoder according to claim 14, the hardware processor further configured to determine a mode with a minimum optimization criteria cost as an intra-frame prediction mode after the prediction residual is encoded in various encoding modes, and obtain an encoding result.

17. The video data encoder according to claim 14, the hardware processor further configured to select a method for encoding the transformation matrix index according to a selected intra-frame prediction mode to write the transformation matrix index into encoded data.

18. The video data encoder according to claim 14, the hardware processor further configured to: traverse all combinations of a column transformation matrix and a row transformation matrix in the plurality of candidate transformation matrices, select a transformation combination with a minimum optimization criteria cost after residual transform-coding as a best transformation matrix, and obtain a transformation result.

19. A video decoder, comprising:

a hardware processor configured to:

resolve a video stream to obtain a transformation result, and obtain a transformation matrix index according to an intra-frame prediction mode;

determine a transformation matrix among a plurality of candidate transformation matrices according to the transformation matrix index information; and use the determined transformation matrix to perform inverse transformation on the transformation result to obtain residual data, and reconstruct video data according to the residual data.

20. The video decoder according to claim 19, the hardware processor further configured to select a scan order of a set of coefficients according to the transformation matrix index to perform inverse coefficient scanning on a transformed coefficient.

21. The video decoder according to claim 19, the hardware processor further configured to determine a transformation matrix among a set of candidate row transformation matrices and column transformation matrices according to row transformation matrix index and column transformation matrix index in the transformation matrix index.

* * * * *

UNITED STATES PATENT AND TRADEMARK OFFICE
CERTIFICATE OF CORRECTION

PATENT NO. : 9,723,313 B2
APPLICATION NO. : 13/452198
DATED : August 1, 2017
INVENTOR(S) : Mingyuan Yang et al.

It is certified that error appears in the above-identified patent and that said Letters Patent is hereby corrected as shown below:

In the Claims

Column 26, Line 24:
In Claim 13, after "matrix index" delete "information", therefore.

Column 27, Line 3:
In Claim 19, after "matrix index" delete "information", therefore.

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*